(12) United States Patent
Muramoto et al.

(10) Patent No.: US 9,205,960 B2
(45) Date of Patent: Dec. 8, 2015

(54) MOISTURE-ABSORBING RESIN COMPOSITION AND MOLDED PRODUCT THEREOF

(75) Inventors: Katsuhiro Muramoto, Kanagawa (JP); Yuhei Yonekawa, Kanagawa (JP); Daisuke Tsuchimoto, Kanagawa (JP); Toshio Akimoto, Saitama (JP); Kouhei Sasaki, Chiba (JP)

(73) Assignees: DAINICHISEIKA COLOR & CHEMICALS MFG. CO., LTD., Tokyo (JP); JAPAN CROWN CORK CO., LTD., Tokyo (JP)

(*) Notice: Subject to any disclaimer, the term of this patent is extended or adjusted under 35 U.S.C. 154(b) by 241 days.

(21) Appl. No.: 13/500,248

(22) PCT Filed: Oct. 19, 2010

(86) PCT No.: PCT/JP2010/068394
§ 371 (c)(1),
(2), (4) Date: Apr. 4, 2012

(87) PCT Pub. No.: WO2011/052433
PCT Pub. Date: May 5, 2011

(65) Prior Publication Data
US 2012/0193576 A1 Aug. 2, 2012

(30) Foreign Application Priority Data
Oct. 26, 2009 (JP) .................. 2009-245823

(51) Int. Cl.
C08L 53/00 (2006.01)
B01J 20/26 (2006.01)
(Continued)

(52) U.S. Cl.
CPC .............. *B65D 43/162* (2013.01); *B65D 25/14* (2013.01); *B65D 81/266* (2013.01); *C08L 23/0869* (2013.01); *C08L 91/06* (2013.01)

(58) Field of Classification Search
CPC .................. C08L 53/00; B01J 20/26
USPC ............ 428/35.7, 36.8, 36.92, 339; 430/347, 430/496, 501; 252/194; 264/478
See application file for complete search history.

(56) References Cited

U.S. PATENT DOCUMENTS 5,078,909 A 1/1992 Shigeta et al.
5,827,584 A * 10/1998 Akao et al. .................. 428/35.7
(Continued)

FOREIGN PATENT DOCUMENTS

EP 2 093 162 A1 8/2009
JP 03 109916 5/1991
(Continued)

OTHER PUBLICATIONS

Section 3.1.1 p. 191 of Zeolites and Ordered Mesoporous Materials: Progress and Prospects, vol. 157, by Herman van Bekkum.*
(Continued)

*Primary Examiner* — Gregory R DelCotto
*Assistant Examiner* — Preeti Kumar
(74) *Attorney, Agent, or Firm* — Oblon, McClelland, Maier & Neustadt, L.L.P (57) ABSTRACT

The present invention provides a moisture-absorbing resin composition comprising resin (A) in an amount of 100 parts by mass, and zeolite in an amount of 40 to 300 parts by mass, wherein resin (A) contains at least one polymer selected from among ethylene-methyl acrylate copolymer, ethylene-ethyl acrylate copolymer, ethylene-butyl acrylate copolymer, copolymer of ethylene-ethyl acrylate and acrylonitrile-styrene, and copolymer of ethylene-ethyl acrylate, maleic anhydride, and acrylonitrile-styrene, and a molded product produced through molding of the moisture-absorbing resin composition. The moisture-absorbing resin composition exhibits high moisture absorbency, high moisture absorption rate, and adhesion, and the molded product is produced from the composition.

17 Claims, 2 Drawing Sheets (51) Int. Cl.
*B65D 43/16* (2006.01)
*B65D 25/14* (2006.01)
*B65D 81/26* (2006.01)
*C08L 23/08* (2006.01)
*C08L 91/06* (2006.01)

(56) References Cited

U.S. PATENT DOCUMENTS

| 6,667,358 | B1 | 12/2003 | Aoyama |
| 2007/0111009 | A1 | 5/2007 | Morris et al. |
| 2010/0212930 | A1 | 8/2010 | Yasumoto et al. |

FOREIGN PATENT DOCUMENTS

| JP | 04 093351 | 3/1992 |
| JP | 05 039379 | 2/1993 |
| JP | 08 58043 | 3/1996 |
| JP | 2001 031803 | 2/2001 |
| JP | 2001 106839 | 4/2001 |
| JP | 2002 226715 | 8/2002 |
| JP | 2004 352255 | 12/2004 |
| JP | 2007 512405 | 5/2007 |
| JP | 2008 308674 | 12/2008 |
| WO | 2007 080872 | 7/2007 |

OTHER PUBLICATIONS

Extended European Search Report issued on Mar. 6, 2013, in European patent Application No. 10826565.3.

* cited by examiner

MOISTURE-ABSORBING RESIN COMPOSITION AND MOLDED PRODUCT THEREOF

CROSS-REFERENCE TO RELATED APPLICATIONS

This application is a National Stage of PCT/JP2010/068394 filed on Oct. 19, 2010. This application is based upon and claims the benefit of priority to Japanese Application No. 2009-245823 filed on Oct. 26, 2009.

BACKGROUND OF THE INVENTION

1. Technical Field

The present invention relates to a moisture-absorbing resin composition, and to a molded product of the composition. More particularly, the present invention relates to a moisture-absorbing resin composition exhibiting higher moisture absorbency and higher moisture absorption rate, as compared with conventional resin compositions, and also exhibiting adhesion; and to a molded product produced from the composition.

2. Background Art

Hitherto, upon packaging of drugs, foods (including healthy foods), cosmetics, semiconductor products, machine parts, etc., a desiccant formed of, for example, silica gel, calcium chloride, calcium oxide, or zeolite has been used for the purpose of preventing degradation of such a commercial product due to moisture absorption.

When such a desiccant in the form of particles or powder is used for the aforementioned purpose (i.e., protection of a commercial product from moisture absorption), the particulate or powdery desiccant is packed with paper or nonwoven fabric or sealed into a container or the like, and the packed or sealed desiccant is packaged together with the commercial product. Therefore, there often arise problems, including breakage of the packing material used for packing of a desiccant, and accidental swallowing of a desiccant when the desiccant is packaged together with a food.

Thus, there has been proposed means for solving such a problem, which employs a molded product formed through molding of a mixture of a thermoplastic resin and fine desiccant particles.

For example, Patent Document 1 discloses a moisture-absorbing container characterized by being formed of a polyolefin resin layer (A) exhibiting moisture-proof property, and a polyolefin resin composition layer (B) which contains an inorganic compound having moisture absorbency and which is provided inside the layer (A). Patent Document 2 discloses a moisture-absorbing composition and a molded product thereof, the composition being prepared through kneading of a water-insoluble thermoplastic resin with synthetic zeolite, wherein at least a portion of the water-insoluble thermoplastic resin is a water-vapor-transmitting resin having a water vapor transmission rate (40° C., 90% RH, thickness: 100 μm) of 100 g/(m²·24 hr) or more. The humidity in such a moisture-absorbing container can be maintained at a low level for a long period of time.

A container formed of the aforementioned moisture-absorbing resin layer is used for storing a product whose performance is likely to be impaired through moisture absorption (e.g., a blood glucose level sensor or a urine test strip). When such a product is stored in the container, upon use of the product, the container is repeatedly opened and closed for removal of the product therefrom. In such a case, once the container is opened (uncovered), moisture-containing air enters the container. Therefore, the container is required to have moisture absorbency; i.e., ability to reduce the humidity in the container to a low level within a short period of time after closing of the container. In view of the foregoing, demand has arisen for a moisture-absorbing resin composition or a molded product thereof used for such a container; i.e., a resin composition exhibiting high moisture absorbency and high moisture absorption rate, or a molded product of the composition.

PRIOR ART DOCUMENT

Patent Document

Patent Document 1: Japanese Patent Application Laid-Open (kokai) No. 2004-352255
Patent Document 2: Japanese Patent Application Laid-Open (kokai) No. 2005-15568

SUMMARY OF THE INVENTION

Problems to be Solved by the Invention

In order to solve the aforementioned problems, an object of the present invention is to provide a moisture-absorbing resin composition exhibiting high moisture absorbency and high moisture absorption rate, and also exhibiting adhesion. Another object of the present invention is to provide a molded product produced from the composition.

Means for Solving the Problems

The present inventors have conducted extensive studies for achieving the aforementioned objects, and as a result have found that the aforementioned problems can be solved by providing a composition containing any of the below-described specific acrylic resins and zeolite in specific proportions. The present invention has been accomplished on the basis of this finding.

Accordingly, the present invention provides the following (1) to (5):

(1) a moisture-absorbing resin composition comprising resin (A) in an amount of 100 parts by mass, and zeolite in an amount of 40 to 300 parts by mass, wherein resin (A) contains at least one polymer selected from among ethylene-methyl acrylate copolymer, ethylene-ethyl acrylate copolymer, ethylene-butyl acrylate copolymer, copolymer of ethylene-ethyl acrylate and acrylonitrile-styrene, and copolymer of ethylene-ethyl acrylate, maleic anhydride, and acrylonitrile-styrene;

(2) a moisture-absorbing resin composition according to (1) above, wherein the total amount of methyl acrylate units, ethyl acrylate units, and butyl acrylate units contained in 100 parts by mass of resin (A) is 15 mass % or more;

(3) a moisture-absorbing resin composition according to (1) above, which further contains a dispersant in an amount of 0.5 to 5 parts by mass;

(4) a moisture-absorbing resin composition according to (3) above, wherein the dispersant is at least one species selected from among magnesium stearate, calcium stearate, zinc stearate, and low-molecular-weight polyethylene wax; and (5) a molded product produced through molding of a moisture-absorbing resin composition as recited in any of (1) to (4) above.

Effects of the Invention

The moisture-absorbing resin composition of the present invention or a molded product thereof exhibits higher moisture absorbency and higher moisture absorption rate, as compared with conventional resin compositions, and also exhibits adhesion. Specifically, the moisture-absorbing resin composition or a molded product thereof—which essentially contains zeolite and, as a resin component, at least one polymer selected from among ethylene-methyl acrylate copolymer, ethylene-ethyl acrylate copolymer, ethylene-butyl acrylate copolymer, copolymer of ethylene-ethyl acrylate and acrylonitrile-styrene, and copolymer of ethylene-ethyl acrylate, maleic anhydride, and acrylonitrile-styrene—exhibits more effective moisture absorbency, as compared with zeolite alone. Furthermore, the moisture-absorbing resin composition is effectively employed for producing a moisture-absorbing molded product (including a layered product) without requirement of an adhesive, since the resin component of the composition exhibits adhesion.

BEST MODES FOR CARRYING OUT THE INVENTION

The moisture-absorbing resin composition of the present invention contains a resin in an amount of 100 parts by mass, and zeolite in an amount of 40 to 300 parts by mass, wherein the resin contains at least one species selected from among ethylene-methyl acrylate copolymer (EMA), ethylene-ethyl acrylate copolymer (EEA), ethylene-butyl acrylate copolymer (EBA), copolymer of EEA and acrylonitrile-styrene (AS), and copolymer of EEA, maleic anhydride, and AS.

The moisture-absorbing resin composition of the present invention, which contains the aforementioned components, exhibits high moisture absorbency and high moisture absorption rate, and also exhibits quick-drying property. The composition maintains a moisture absorption effect for a long period of time, and thus is suitable for producing a product which is repeatedly used. This is because, even when the product is repeatedly used, the moisture absorbency of the product is less likely to be impaired.

When the amount of zeolite is less than 40 parts by mass, sufficient moisture absorption effect may fail to be attained, whereas when the amount of zeolite exceeds 300 parts by mass, zeolite is insufficiently dispersed in the composition, and thus effective moisture absorbency may fail to be attained. In such a case, difficulty may be encountered in molding the composition into a product, and the resultant molded product may exhibit impaired physical properties.

The amount of zeolite incorporated is preferably 40 to 300 parts by mass, more preferably 50 to 200 parts by mass, on the basis of 100 parts by mass of the resin containing at least one species selected from the aforementioned polymers.

No particular limitation is imposed on the type of zeolite employed, and zeolite may be, for example, a salt containing an ion of a metal such as sodium, potassium, calcium, silver, lithium, or beryllium. Specific examples of zeolite include $[K,Na][(AlO_2)(SiO_2)]_n H_2O$, $Na[(AlO_2)(SiO_2)]_n H_2O$, and $43Na[43(AlO_2)53(SiO_2)]_n H_2O$, which are characterized by having a pore size of 3 to 12 Å. In a particularly preferred embodiment, zeolite containing potassium ion (pore size: 3 Å) is employed.

The moisture-absorbing resin composition of the present invention may contain resin component (B) in addition to resin (A) containing at least one species selected from among the aforementioned polymers. In a preferred embodiment, resin (A) is mixed with a resin (e.g., general-purpose olefin resin or engineering plastic resin) for the purpose of increasing the melt mass flow rate (MFR) of the resin composition to thereby improve the moldability of the composition, or imparting resin properties to a molded product (e.g., improving physical properties of the molded product). Examples of the additionally employed resin include low density polyethylene, medium density polyethylene, high density polyethylene, polypropylene, polystyrene, acrylonitrile butadiene styrene, polymethyl methacrylate, and ethylene-glycidyl methacrylate copolymer. The additionally employed resin is preferably acrylonitrile butadiene styrene, polymethyl methacrylate, or ethylene-glycidyl methacrylate copolymer. Preferably, the amount of resin component (B) mixed is adjusted so that the total amount of methyl acrylate, ethyl acrylate, and butyl acrylate contained in the resin mixture of resin (A) and resin component (B) is 15 mass % or more. In such a preferred case, the resin composition can be employed while maintaining its sufficient moisture absorbency. For example, when low density polyethylene (10 parts by mass) is added to and mixed with an acrylate copolymer (90 parts by mass) containing an ethyl acrylate component in an amount of 25 mass %, the amount of the ethyl acrylate component is 22.5 mass % on the basis of the total amount of these two types of polymers (resins), and thus a molded product produced from the resin mixture sufficiently exhibits a moisture-absorbing effect.

The moisture-absorbing resin composition of the present invention may contain a dispersant for the purpose of uniformly dispersing zeolite in the composition. Examples of the dispersant include metal soaps such as zinc stearate, magnesium stearate, lithium stearate, aluminum stearate, calcium stearate, and calcium 12-hydroxystearate; ethylenebisstearylamide; low-molecular-weight polyethylene wax; liquid paraffin; paraffin synthetic wax; polypropylene wax; and silicone oil. The dispersant is preferably zinc stearate, magnesium stearate, calcium stearate, or low-molecular-weight polyethylene wax.

The amount of the dispersant is generally 0.5 to 5 parts by mass, preferably 1 to 3 parts by mass, on the basis of 100 parts by mass of the resin. When the amount of the dispersant is 5 parts by mass or less, since an excessively large amount of the dispersant is not deposited on the surfaces of zeolite particles, and thus moisture-absorbing effect is not impaired. Meanwhile, when the amount of the dispersant is 0.5 parts by mass or more, the resultant molded product does not have a rough surface; i.e., the molded product exhibits a favorable appearance. In consideration of the intended use of the resin composition, a dispersant is not necessarily added to the composition. Thus, the resin composition, which exhibits both adhesion and moisture absorbency, may be applied to a layered molded product without addition of a dispersant.

The moisture-absorbing resin composition of the present invention may contain an additive in addition to the aforementioned components, so long as the effects of the present invention are not impaired. The additive incorporated may be a lubricant, an antistatic agent, a UV inhibitor, or an antioxidant. Examples of the lubricant include higher fatty acids, ester waxes, polyethylene waxes, and metal soaps. Examples of the antistatic agent include fatty acid amines, fatty acid alcohols, fatty acid esters, fatty acid amides, and sulfonic acid compounds. Examples of the UV inhibitor include salicylic acid derivative compounds, benzophenone compounds, benzotriazole compounds such as benzotriazole derivatives, and cyanoacrylate compounds. Examples of the antioxidant include phenolic antioxidants, phosphorus-containing antioxidants, phosphite antioxidants, and thiourea antioxidants. The resin composition preferably contains at least one species of these additives in combination with the aforementioned components.

The moisture-absorbing resin composition of the present invention (colored resin composition) may be generally prepared through melt mixing and dispersion treatment by means of, for example, a Banbury mixer, a Nauta mixer, a kneading roller, or a single-screw or twin-screw extruder. Before kneading, preliminary dispersion treatment may be carried out by means of a tumbler mixer, a blender, or a high-speed mixer for the purpose of achieving uniform dispersion of zeolite.

No particular limitation is imposed on the method for producing a molded product from the moisture-absorbing resin composition of the present invention, and the molded product may be produced through a known technique such as injection molding, extrusion molding, or compression molding.

The molded product may be in a variety of forms, such as sheet, film, cap, cup, container having a cover, and casing. For example, the molded product assumes a form shown in FIG. 2; i.e., the molded product is in the form of a container having a cover for storing a product such as a blood glucose level sensor or a urine test strip. The molded product 1 shown in FIG. 2 includes an outer member 2 which is formed of a thermoplastic resin and which includes a cylindrical main portion 4 having a bottom wall, a cover portion 5, and a hinge portion 6; and an inner member 3 which is formed of the moisture-absorbing resin composition and which is provided on the inner surface of the cylindrical main portion 4, wherein the cylindrical main portion 4, the cover portion 5, and the hinge portion 6 have been integrally molded such that the cover portion 5 is openably/closably attached to the cylindrical main portion 4 via the hinge portion 6. Engaging portions are provided at the top of the side wall of the cylindrical main portion 4 and at the inside of the side wall of the cover portion 5. Therefore, when the cover portion is closed, the engaging portions are engaged with each other, and the container can be reliably maintained in a closed state.

Figure 2:
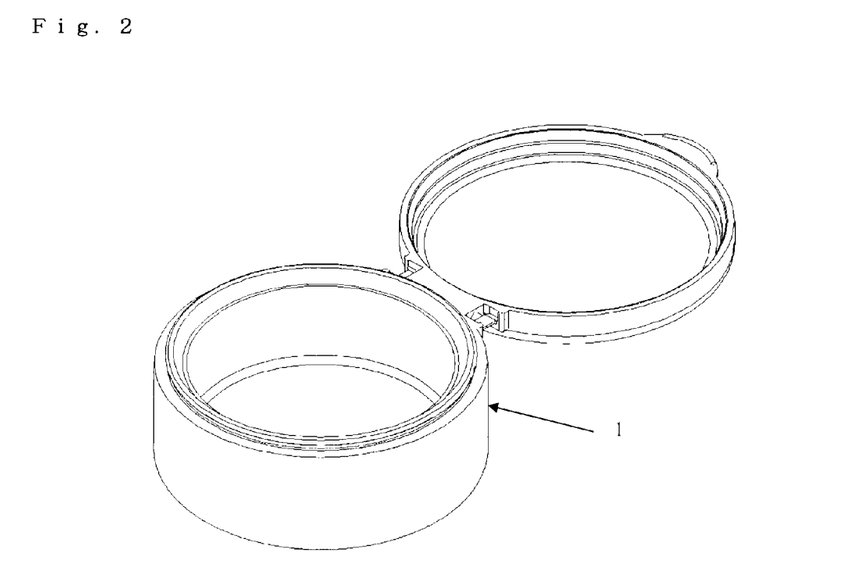
FIG. 2 is a perspective view of a molded product produced in each of the Examples and the Comparative Examples, the molded product being in an open state.
Figure 3:
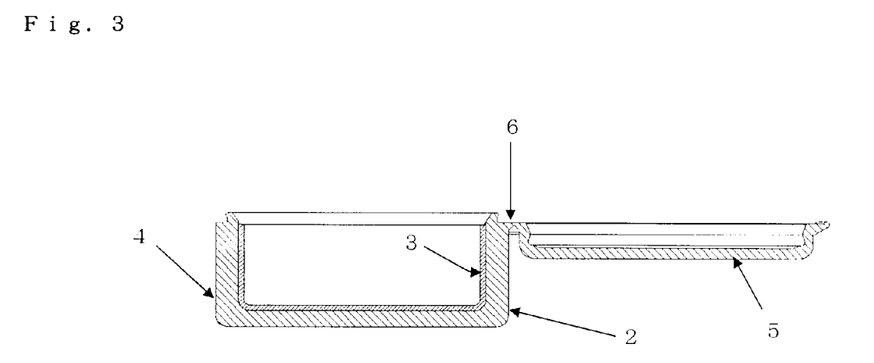
FIG. 3 is a side cross-sectional view of a molded product produced in each of the Examples and the Comparative Examples, the molded product being in an open state.

The thermoplastic resin material of the outer member 2 may be any of the aforementioned resins serving as resin component (B). However, in consideration of hermetic sealing of the container, for example, low, medium, or high density polyethylene, linear low density polyethylene, or polypropylene is preferably employed. The aforementioned container having a cover may be produced through two-color injection molding (i.e., simultaneous molding of two materials) by means of a two-color injection molding machine including two injection units; or through an insert molding process in which the inner member 3 is formed in advance, and subsequently, while the inner member 3 is held in a mold, the outer member 2 is formed through injection molding.

EXAMPLES

The present invention will next be described in more detail by way of examples. However, the present invention is not limited to the examples without departing from the scope of the invention.

Example 1

(1) Preparation of Resin Composition

Ethylene-ethyl acrylate [EEA] (DPD-J9169 (trade name), product of NUC) (100 parts by mass) was mixed with type A zeolite (pore size: 3 Å) (containing Na and K ions) (Molecular Sieve 3A (trade name), product of Union Showa K.K.) (233 parts by mass) and magnesium stearate (Magnesium Stearate, product of NOF Corporation) (3 parts by mass). The resultant mixture was added to a twin-screw extruder (TEX-30α (trade name), product of JSW), and zeolite was uniformly dispersed in the mixture, to thereby prepare a compound. Kneading conditions are shown in Table 1.

TABLE 1

| Setup item | | Unit | Setup value |
|---|---|---|---|
| Feeder rotation speed | | rpm | 15 |
| Main screw rotation speed | | rpm | 170 |
| Cylinder temperature | C1 | ° C. | 150 |
| | C2 | | 160 |
| | C3 | | 170 |
| | C4 | | 170 |
| | C5 | | 170 |
| | C6 | | 170 |
| | C7 | | 170 |
| | C8 | | 170 |
| | C9 | | 165 |
| | C10 | | 160 |
| Adaptor | | | 160 |
| Head | | | 160 |

(2) Preparation of Test Sheet

The thus-prepared compound was molded into a sheet (thickness: 0.5 mm, size: 20 cm×20 cm) by means of a compression molding machine (product of Shindo Kinzoku Kogyo). Pressurization was carried out at 160° C. and 15 MPa for one minute by means of the compression molding machine, followed to cooling, to thereby prepare a test sheet.

Before testing, the test sheet was dried at 60° C. for two hours by means of a dehumidification dryer (dew point: −30° C.)

(3) Production of Molded Product for Testing

A molded product as shown in FIG. 2 was produced through two-color molding from polypropylene (for forming the outer member) and the above-prepared compound (for forming the inner member).

(4) Evaluation Methods

1. Moisture Absorption Test

For the moisture absorption test, the test sheet and a hygrometer (3641 Temperature/Humidity Logger, product of Hioki E.E. Corporation) were placed in a desiccator, and the desiccator was filled with air (23° C., relative humidity: 90%). This humidity-adjusted air was prepared by means of a thermo-hygrostat (AGX-224, product of Toyo Seiki Seisakusho, Ltd.).

The desiccator to which the test sheet, the hygrometer, and the humidity-adjusted air had been added was covered so as to prevent leakage of the air, and allowed to stand still at 23° C. and a relative humidity of 50%.

The humidity in the desiccator was recorded at regular intervals by means of the hygrometer.

Figure 1:
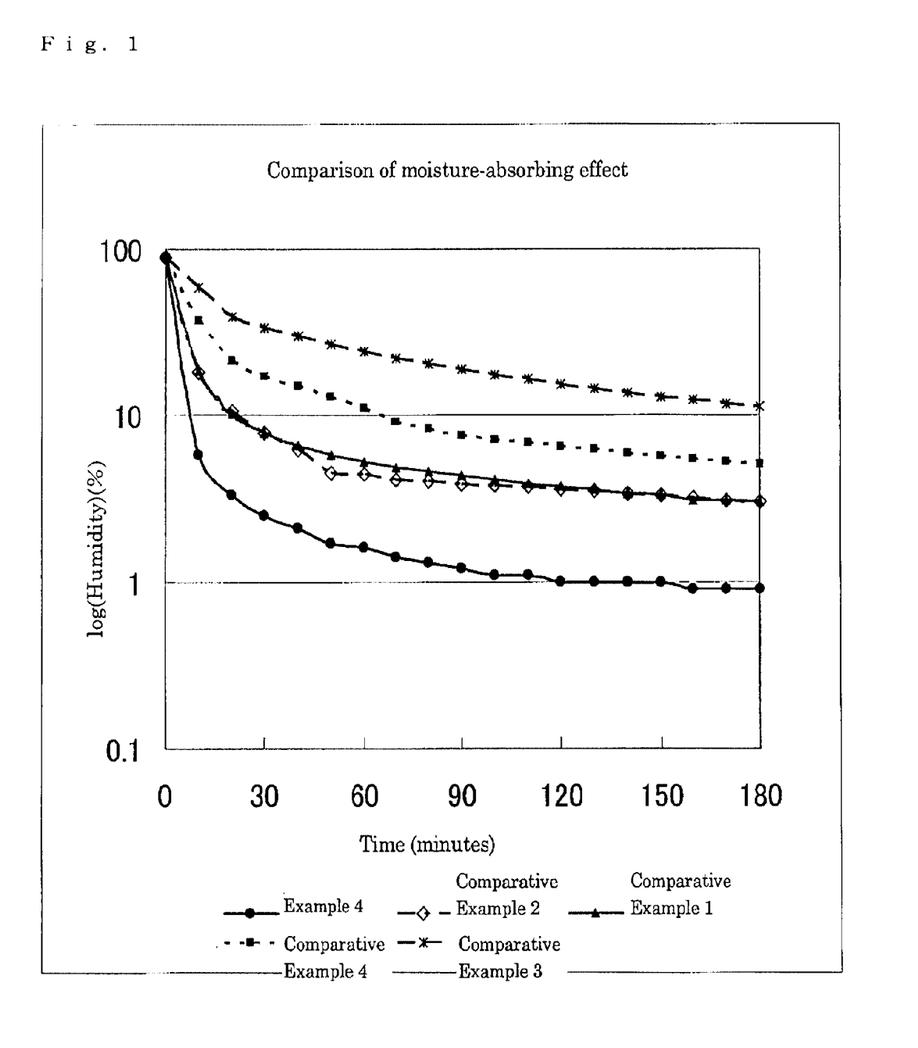
FIG. 1 is a graph showing change over time in humidity of resin compositions prepared in Example 4 and Comparative Examples 1 to 4.

Graphs showing change over time in humidity were prepared on the basis of the thus-obtained humidity data. FIG. 1 shows an example of the thus-prepared graphs.

Three hours after initiation of the test, the hygrometer was removed from the desiccator for humidity measurement.

2. Initial Moisture Absorption Rate

Initial moisture absorption rate (V) was calculated on the basis of the graphs prepared above in the moisture absorption test. Initial moisture absorption rate (V: %/min) was calculated by use of the following formula:

$$\text{initial moisture absorption rate } (V) = \{(H0-H1)\}/10 \qquad \text{formula (1)}$$

(wherein H0 represents the humidity as measured at the initiation (0 min) of the moisture absorption test, and H1 represents the humidity as measured 10 minutes after initiation of the moisture absorption test).

3. Measurement of Melt Mass Flow Rate (MFR)

Measurement of MFR was carried out according to JIS K7210 [Test Method of Melt Mass Flow Rate (MFR) and Melt Volume Flow Rate (MVR) of Plastic—Thermoplastic Plastic]. Specifically, MFR was measured by means of an MFR measuring machine (Melt Indexer L241 (trade name), product of Takara Thermistor Co., Ltd.). The cylinder of the measuring machine was heated to 190° C., and aging was carried out 15 minutes or longer, followed by charging of a sample into the cylinder. A piston and a weight were placed on the sample (load: 2.16 kg). Preliminary heating was carried out, and a portion of the sample flowed out of the cylinder (for 30 seconds) was removed therefrom and weighed. The thus-measured weight was converted to outflow amount (g/10 min).

4. Evaluation of Moldability (Evaluation of Appearance and Adhesion)

During production of a molded product as shown in FIG. 2 from the compound, the moldability of the compound was evaluated.

For evaluation of the moldability of the compound, the molded product (container) was visually evaluated in terms of appearance of the inner member, as well as adhesion between the outer member and the inner member serving as a moisture-absorbing member.

Appearance was evaluated according to the following criteria:

○: favorable dimensional accuracy, shape, and surface state;

Δ: slightly poor dimensional accuracy, shape, and surface state; and x: poor dimensional accuracy and shape, and stripes or irregularities on the surface.

Adhesion was evaluated according to the following criteria:

○: reliable adhesion between the inner member and the outer member in the molded product (container);

Δ: partial separation of the inner member from the outer member in the molded product (container); and x: separation of the inner member from the outer member in the molded product (container).

5. Evaluation of Odor

A sample of the test sheet (3 g) was hermetically sealed in a glass bottle (capacity: 50 cc) having a cap. The bottle was heated in a box-type dryer at 50° C. for 30 minutes. After completion of heating, the cap of the bottle was opened in an odorless room, and the odor of the sample was organoleptically evaluated by five testers.

Based on the answers by the five testers, the odor of the sample was evaluated according to the following criteria:

○: no malodor (very excellent);

Δ: slight malodor; and x: unpleasant malodor.

Table 2 shows results obtained through the aforementioned evaluation methods 1 to 5.

Examples 2 to 5

Table 2 shows the formulations of moisture-absorbing resin compositions. In each of Examples 2 to 5, the same components as in Example 1 were employed in combination, and the amount of zeolite (pore size: 3 Å) containing Na and K was changed.

A test sheet was prepared in a manner similar to that described in Example 1, and the test sheet was evaluated through the aforementioned evaluation methods 1 to 5. The results are shown in Table 2.

Examples 6 to 8

Table 2 shows the formulations of moisture-absorbing resin compositions. In each of Examples 6 to 8, the amounts of the respective components were the same as those in Example 4, and the type of zeolite was changed as follows.

In Example 6, zeolite (pore size: 3 Å) containing Na, K, and Ca was employed. In Example 7, zeolite (pore size: 4 Å) containing Na was employed. In Example 8, zeolite (pore size: 5 Å) containing Na and Ca was employed.

A test sheet was prepared in a manner similar to that described in Example 1, and the test sheet was evaluated through the aforementioned evaluation methods 1 to 5. The results are shown in Table 2.

Examples 9 to 12

Table 3 shows the formulations of moisture-absorbing resin compositions. In each of Examples 9 to 12, the amounts of the respective components were the same as those in Example 4, and the type of resin was changed as follows: ethylene-butyl acrylate [EBA] (ELVAROY 3717AC (trade name), product of Du Pont-Mitsui Polychemicals, Co., Ltd.) (Example 9); ethylene-methyl acrylate [EMA] (ELVALOY 1820AC (trade name), product of Du Pont-Mitsui Polychemicals, Co., Ltd.) (Example 10); copolymer of ethylene-ethyl acrylate [EEA] and acrylonitrile-styrene [AS] (Modiper 5400 (trade name), product of NOF Corporation) (Example 11); or copolymer of ethylene-ethyl acrylate [EEA], acrylonitrile-styrene [AS], and maleic anhydride (Modiper 8400 (trade name), product of NOF Corporation) (Example 12).

A test sheet was prepared in a manner similar to that described in Example 1, and the test sheet was evaluated through the aforementioned evaluation methods 1 to 5. The results are shown in Table 3.

Examples 13 to 15

Table 3 shows the formulations of moisture-absorbing resin compositions. In each of Examples 13 to 15, the amounts of the respective components were the same as those in Example 4, and the type of dispersant was changed as follows.

In Example 13, calcium stearate (Calcium Stearate (trade name), product of Sakai Chemical Industry Co., Ltd.) was employed. In Example 14, zinc stearate (Zinc Stearate (trade name), product of NOF Corporation) was employed. In Example 15, low-molecular-weight polyethylene wax (AC Polyethylene 6 (trade name), product of Honeywell) was employed.

A test sheet was prepared in a manner similar to that described in Example 1, and the test sheet was evaluated through the aforementioned evaluation methods 1 to 5. The results are shown in Table 3.

Examples 16 and 17

Table 4 shows the formulations of moisture-absorbing resin compositions. In each of Examples 16 and 17, the amounts of the respective components were the same as those in Example 4, except that the amount of dispersant was changed.

A test sheet was prepared in a manner similar to that described in Example 1, and the test sheet was evaluated through the aforementioned evaluation methods 1 to 5. The results are shown in Table 4.

Examples 18 to 20

Table 4 shows the formulations of moisture-absorbing resin compositions. In each of Examples 18 to 20, the amounts of the respective components were the same as those in Example 4, and the type of resin was changed as follows: a mixture of ethylene-ethyl acrylate (ethyl acrylate content: 20 mass %) (DPD-J9169 (trade name), product of NUC) and low density polyethylene (Novatec LD JF641M (trade name), product of Japan Polyethylene Corporation) (Example 18); a mixture of DPD-J9169 and polypropylene (Novatec PP BC03C (trade name), product of Japan Polypropylene Corporation) (Example 19); or a mixture of DPD-J9169 and polystyrene (Dicstyrene CR-2500 (trade name), product of DIC) (Example 20). In each of Examples 18 to 20, the amount of the ethyl acrylate component was 18 mass % with respect to the amount of the resin component.

A test sheet was prepared in a manner similar to that described in Example 1, and the test sheet was evaluated through the aforementioned evaluation methods 1 to 5. The results are shown in Table 4.

Comparative Example 1

Preparation of Compound

Ethylene-vinyl acetate copolymer [EVA] (Evaflex 360 (trade name), product of Du Pont-Mitsui Polychemicals, Co., Ltd.) (100 parts by mass) was mixed with type A zeolite (pore size: 3 Å) (containing Na and K ions) (Molecular Sieve 3A (trade name), product of Union Showa K.K.) (67 parts by mass) and magnesium stearate (Magnesium Stearate, product of NOF Corporation) (2 parts by mass). The resultant mixture was added to a twin-screw extruder (TEX-30α (trade name), product of JSW), and zeolite was uniformly dispersed in the mixture, to thereby prepare a compound.

A test sheet was prepared in a manner similar to that described in Example 1, and the test sheet was evaluated through the aforementioned evaluation methods 1 to 5. The results are shown in Table 5.

Comparative Examples 2 and 3

In each of Comparative Examples 2 and 3, the amounts of the respective components were the same as those in Comparative Example 1, and the type of resin was changed as follows: polyvinyl alcohol [PVA] (product of Kuraray Co., Ltd.) (Comparative Example 2), or low density polyethylene [LDPE] (Suntec M2270 (trade name), product of Asahi Kasei Chemicals Corporation) (Comparative Example 3).

A test sheet was prepared in a manner similar to that described in Example 1, and the test sheet was evaluated through the aforementioned evaluation methods 1 to 5. The results are shown in Table 5.

Comparative Example 4

In Comparative Example 4, type A zeolite (containing Na and K ions) alone was subjected to the moisture absorption test.

Zeolite powder was weighed so that the mass thereof was adjusted to be equal to that of zeolite contained in the mixture described in Example 1. In this case, evaluation was carried out through the aforementioned methods 1, 2, and 5. The results are shown in Table 5.

TABLE 2

| | Formulation | | | Humidity (3 hours later) | Initial moisture absorption rate %/min | MFR g/10 min | Molded product | | |
|---|---|---|---|---|---|---|---|---|---|
| | | | | | | | Appearance | Adhesion | Odor |
| Ex. 1 | EEA | 100 | parts | 2.0% | 7.9 | 0.3 | ○ | ○ | ○ |
| | Type A zeolite (sodium•potassium salt) | 233 | parts | | | | | | |
| | Magnesium stearate | 3 | parts | | | | | | |
| Ex. 2 | EEA | 100 | parts | 1.4% | 8.2 | 0.9 | ○ | ○ | ○ |
| | Type A zeolite (sodium•potassium salt) | 150 | parts | | | | | | |
| | Magnesium stearate | 3 | parts | | | | | | |
| Ex. 3 | EEA | 100 | parts | 0.8% | 8.4 | 2.3 | ○ | ○ | ○ |
| | Type A zeolite (sodium•potassium salt) | 100 | parts | | | | | | |
| | Magnesium stearate | 2 | parts | | | | | | |
| Ex. 4 | EEA | 100 | parts | 0.9% | 8.4 | 4.7 | ○ | ○ | ○ |
| | Type A zeolite (sodium•potassium salt) | 67 | parts | | | | | | |
| | Magnesium stearate | 2 | parts | | | | | | |
| Ex. 5 | EEA | 100 | parts | 2.4% | 7.9 | 11.7 | ○ | ○ | ○ |
| | Type A zeolite (sodium•potassium salt) | 43 | parts | | | | | | |
| | Magnesium stearate | 1 | part | | | | | | |
| Ex. 6 | EEA | 100 | parts | 1.1% | 8.0 | 4.3 | ○ | ○ | ○ |
| | Type A zeolite (sodium•potassium•calcium salt) | 67 | parts | | | | | | |
| | Magnesium stearate | 2 | parts | | | | | | |

TABLE 2-continued

| | Formulation | | | Humidity (3 hours later) | Initial moisture absorption rate %/min | MFR g/10 min | Molded product Appearance | Adhesion | Odor |
|---|---|---|---|---|---|---|---|---|---|
| Ex. 7 | EEA | 100 | parts | 1.5% | 7.7 | 5.2 | ○ | ○ | ○ |
| | Type A zeolite (sodium salt) | 67 | parts | | | | | | |
| | Magnesium stearate | 2 | parts | | | | | | |
| Ex. 8 | EEA | 100 | parts | 1.5% | 7.4 | 4.9 | ○ | ○ | ○ |
| | Type A zeolite (sodium•calcium salt) | 67 | parts | | | | | | |
| | Magnesium stearate | 2 | parts | | | | | | |

TABLE 3

| | Formulation | | | Humidity (3 hours later) | Initial moisture absorption rate %/min | MFR g/10 min | Molded product Appearance | Adhesion | Odor |
|---|---|---|---|---|---|---|---|---|---|
| Ex. 9 | EBA | 100 | parts | 0.9% | 8.6 | 3.1 | ○ | ○ | ○ |
| | Type A zeolite (sodium•potassium salt) | 67 | parts | | | | | | |
| | Magnesium stearate | 2 | parts | | | | | | |
| Ex. 10 | EMA | 100 | parts | 1.2% | 8.4 | 4.2 | ○ | ○ | ○ |
| | Type A zeolite (sodium•potassium salt) | 67 | parts | | | | | | |
| | Magnesium stearate | 2 | parts | | | | | | |
| Ex. 11 | Modiper 5400 (NOF Corporation) EEA-AS copolymer | 100 | parts | 1.4% | 8.3 | 2.4 | ○ | ○ | ○ |
| | Type A zeolite (sodium•potassium salt) | 67 | parts | | | | | | |
| | Magnesium stearate | 2 | parts | | | | | | |
| Ex. 12 | Modiper 8400 (NOF Corporation) EEA-Maleic anhydride-AS copolymer | 100 | parts | 1.7% | 8.3 | 2.8 | ○ | ○ | ○ |
| | Type A zeolite (sodium•potassium salt) | 67 | parts | | | | | | |
| | Magnesium stearate | 2 | parts | | | | | | |
| Ex. 13 | EEA | 100 | parts | 1.6% | 8.3 | 4.6 | ○ | ○ | ○ |
| | Type A zeolite (sodium•potassium salt) | 67 | parts | | | | | | |
| | Calcium stearate | 2 | parts | | | | | | |
| Ex. 14 | EEA | 100 | parts | 1.4% | 8.4 | 4.7 | ○ | ○ | ○ |
| | Type A zeolite (sodium•potassium salt) | 67 | parts | | | | | | |
| | Zinc stearate | 2 | parts | | | | | | |
| Ex. 15 | EEA | 100 | parts | 2.2% | 7.8 | 4.9 | ○ | ○ | ○ |
| | Type A zeolite (sodium•potassium salt) | 67 | parts | | | | | | |
| | Low-molecular-weight polyethylene wax | 2 | parts | | | | | | |

TABLE 4

| | Formulation | | | Humidity (3 hours later) | Initial moisture absorption rate %/min | MFR g/10 min | Molded product Appearance | Adhesion | Odor |
|---|---|---|---|---|---|---|---|---|---|
| Ex. 16 | EEA | 100 | parts | 2.7% | 7.3 | 4.5 | Δ | ○ | ○ |
| | Type A zeolite (sodium•potassium salt) | 67 | parts | | | | | | |
| | Magnesium stearate | 0.5 | parts | | | | | | |
| Ex. 17 | EEA | 100 | parts | 1.9% | 8.1 | 4.9 | ○ | ○ | ○ |
| | Type A zeolite (sodium•potassium salt) | 67 | parts | | | | | | |
| | Magnesium stearate | 5 | parts | | | | | | |

TABLE 4-continued

| | Formulation | | | Humidity (3 hours later) | Initial moisture absorption rate %/min | MFR g/10 min | Molded product | | |
|---|---|---|---|---|---|---|---|---|---|
| | | | | | | | Appearance | Adhesion | Odor |
| Ex. 18 | EEA | 90 | parts | 2.8% | 7.4 | 4.5 | ◯ | ◯ | ◯ |
| | Polyethylene | 10 | parts | | | | | | |
| | Type A zeolite (sodium•potassium salt) | 67 | parts | | | | | | |
| | Magnesium stearate | 2 | parts | | | | | | |
| Ex. 19 | EEA | 90 | parts | 2.6% | 7.6 | 4.2 | ◯ | ◯ | ◯ |
| | Polypropylene | 10 | parts | | | | | | |
| | Type A zeolite (sodium•potassium salt) | 67 | parts | | | | | | |
| | Magnesium stearate | 2 | parts | | | | | | |
| Ex. 20 | EEA | 90 | parts | 2.5% | 7.5 | 3.5 | ◯ | ◯ | ◯ |
| | Polystyrene | 10 | parts | | | | | | |
| | Type A zeolite (sodium•potassium salt) | 67 | parts | | | | | | |
| | Magnesium stearate | 2 | parts | | | | | | |

TABLE 5

| | Formulation | | | Humidity (3 hours later) | Initial moisture absorption rate %/min | MFR g/10 min | Molded product | | |
|---|---|---|---|---|---|---|---|---|---|
| | | | | | | | Appearance | Adhesion | Odor |
| Comp. Ex. 1 | EVA | 100 | parts | 3.0% | 7.1 | 1.9 | ◯ | Δ | X |
| | Type A zeolite (sodium•potassium salt) | 67 | parts | | | | | | |
| | Magnesium stearate | 2 | parts | | | | | | |
| Comp. Ex. 2 | PVA | 100 | parts | 3.0% | 7.1 | 1.2 | X | X | Δ |
| | Type A zeolite (sodium•potassium salt) | 67 | parts | | | | | | |
| | Magnesium stearate | 2 | parts | | | | | | |
| Comp. Ex. 3 | LDPE | 100 | parts | 11.0% | 3.1 | 2.2 | ◯ | X | ◯ |
| | Type A zeolite (sodium•potassium salt) | 67 | parts | | | | | | |
| | Magnesium stearate | 2 | parts | | | | | | |
| Comp. Ex. 4 | Type A zeolite (sodium•potassium salt) | 100 | parts | 5.1% | 5.2 | — | — | — | ◯ |

INDUSTRIAL APPLICABILITY

As described above in detail, the moisture-absorbing resin composition of the present invention or a molded product thereof exhibits higher moisture absorbency and higher moisture absorption rate, as compared with conventional resin compositions. Therefore, when a product which is sensitive to moisture is stored in a container produced from the resin composition, since, for example, the product contained in the container is prevented from being exposed to moisture, the quality of the product is more effectively and reliably maintained.

Thus, the moisture-absorbing resin composition is useful for producing a molded product requiring quick-drying property in the fields of foods, cosmetics, semiconductor products, machine parts, etc. (e.g., a healthy food container or a semiconductor packaging container). In addition, the resin composition exhibits adhesion. Therefore, when, for example, the resin composition is employed for forming an inner layer of a container, since an adhesive is not required, the container can be produced through a simplified process at low cost.

DESCRIPTION OF REFERENCE NUMERALS

1: Molded product
2: Outer member
3: Inner member
4: Cylindrical main portion
5: Cover portion
6: Hinge portion

The invention claimed is:
1. A moisture-absorbing resin composition, comprising:
0.5 to 5 parts by mass of a dispersant, relative to 100 parts by mass of a resin A; and
67 to 100 parts by mass of a zeolite, relative to the 100 parts by mass of the resin A, wherein the resin A comprises at least one polymer selected from the group consisting of an ethylene-methyl acrylate copolymer, an ethylene-ethyl acrylate copolymer, and an ethylene-butyl acrylate copolymer,
such that, in a moisture absorption test of a test sheet of the moisture-absorbing resin composition, when the test sheet is contacted with air at 23° C. having a relative humidity of 50% in a dessicator for 3 hours, a resulting humidity in the dessicator after the 3 hours is less than 1%.

2. The resin composition of claim 1, wherein a total amount of methyl acrylate units, ethyl acrylate units, and butyl acrylate units in the 100 parts by mass of the resin A is from 15 mass % to 25 mass %.

3. The resin composition of claim 1, comprising 1 to 3 parts by mass of the dispersant, relative to the 100 parts by mass of the resin A.

4. The resin composition of claim 1, wherein the dispersant is at least one selected from the group consisting of magnesium stearate, calcium stearate, zinc stearate, and a low-molecular-weight polyethylene wax.

5. A molded product obtained by molding the moisture-absorbing resin composition of claim 1.

6. The resin composition of claim 1, wherein the zeolite comprises potassium ions.

7. The resin composition of claim 1, comprising 1 to 3 parts by mass of magnesium stearate as the dispersant, relative to the 100 parts by mass of the resin A.

8. The resin composition of claim 3, wherein the dispersant is at least one selected from the group consisting of magnesium stearate, calcium stearate, zinc stearate, and a low-molecular-weight polyethylene wax.

9. The resin composition of claim 1, further comprising at least one additive selected from the group consisting of a lubricant, an antistatic agent, a UV inhibitor, and an antioxidant.

10. The resin composition of claim 1, wherein the dispersant is magnesium stearate, calcium stearate, or zinc stearate.

11. The resin composition of claim 10, wherein the resin A is an ethylene-ethyl acrylate copolymer.

12. The resin composition of claim 10, wherein the resin A is an ethylene-butyl acrylate copolymer.

13. The resin composition of claim 10, wherein the resin A is an ethylene-methyl acrylate copolymer.

14. The resin composition of claim 8, wherein the resin A is an ethylene-ethyl acrylate copolymer, and the dispersant is calcium stearate.

15. The resin composition of claim 8, wherein the resin A is an ethylene-ethyl acrylate copolymer, and the dispersant is zinc stearate.

16. The resin composition of claim 8, wherein the resin A is an ethylene-ethyl acrylate copolymer, and the dispersant is a low-molecular-weight polyethylene wax.

17. The moisture-absorbing resin composition of claim 1, wherein the resin A consists of the at least one polymer selected from the group consisting of an ethylene-methyl acrylate copolymer, an ethylene-ethyl acrylate copolymer, and an ethylene-butyl acrylate copolymer.

* * * * *